United States Patent
Tian et al.

(10) Patent No.: US 11,708,089 B2
(45) Date of Patent: Jul. 25, 2023

(54) SYSTEMS AND METHODS FOR CURIOSITY DEVELOPMENT IN AGENTS

(71) Applicant: Honda Motor Co., Ltd., Tokyo (JP)

(72) Inventors: Ran Tian, Dublin, CA (US); Haiming Gang, San Jose, CA (US); David Francis Isele, Sunnyvale, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 191 days.

(21) Appl. No.: 17/021,457

(22) Filed: Sep. 15, 2020

(65) Prior Publication Data

US 2021/0269060 A1 Sep. 2, 2021

Related U.S. Application Data

(60) Provisional application No. 62/983,345, filed on Feb. 28, 2020.

(51) Int. Cl.
 *B60W 60/00* (2020.01)
 *G05D 1/02* (2020.01)

(52) U.S. Cl.
 CPC .... *B60W 60/0011* (2020.02); *B60W 60/0015* (2020.02); *G05D 1/0221* (2013.01); *G05D 2201/0213* (2013.01)

(58) Field of Classification Search
 None
 See application file for complete search history.

(56) References Cited

U.S. PATENT DOCUMENTS

| | | | |
|---|---|---|---|
| 2019/0113927 A1* | 4/2019 | Englard | G05D 1/0221 |
| 2019/0377354 A1* | 12/2019 | Shalev-Shwartz | B60W 30/0956 |
| 2020/0249674 A1 | 8/2020 | Dally et al. | |
| 2021/0048823 A1 | 2/2021 | Qiu et al. | |
| 2021/0080955 A1* | 3/2021 | Wilkinson | G05D 1/0221 |
| 2021/0094558 A1 | 4/2021 | Garcia et al. | |
| 2021/0269065 A1 | 9/2021 | Haggblade et al. | |

OTHER PUBLICATIONS

Y. Bar-Shalom and E. Tse, "Dual effect, certainty equivalence, and separation in stochastic control," IEEE Transactions on Automatic Control, vol. 19, No. 5, pp. 494-500, 1974.
L. Blackmore and M. Ono, "Convex chance constrained predictive control without sampling," in AIAA Guidance, Navigation, and Control Conference, 2009, p. 5876.
C. F. Camerer, T.-H. Ho, and J.-K. Chong, "A cognitive hierarchy model of games," The Quarterly Journal of Economics, vol. 119, No. 3, pp. 861-898, 2004.

(Continued)

*Primary Examiner* — Tamara L Weber
(74) *Attorney, Agent, or Firm* — Rankin, Hill & Clark LLP

(57) ABSTRACT

Systems and methods for curiosity development in an agent located in an uncertain environment are provided. In one embodiment, the system includes a goal state module, a curiosity module, and a planning module. The goal module is configured to calculate a goal state of a goal associated with the environment. The curiosity module is configured to determine an uncertainty value for the environment and calculate a curiosity reward based on the uncertainty value. The planning module is configured to update a motion plan based on the goal state and the curiosity reward.

17 Claims, 7 Drawing Sheets

(56) References Cited

OTHER PUBLICATIONS

M. Costa-Gomes, V. P. Crawford, and B. Broseta, "Cognition and behavior in normal-form games: an experimental study," Econometrica, vol. 69, No. 5, pp. 1193-1235, 2001.

M. A. Costa-Gomes, V. P. Crawford, and N. Iriberri, "Comparing models of strategic thinking in van huyck, battalio, and beil's coordination games," Journal of the European Economic Association, vol. 7, No. 2-3, pp. 365-376, 2009.

V. P. Crawford and N. Iriberri, "Level-k auctions: Can a nonequilibrium model of strategic thinking explain the winner's curse and overbidding in private-value auctions?" Econometrica, vol. 75, No. 6, pp. 1721-1770, 2007.

A. Feldbaum, "Dual control theory. i," Avtomatika i Telemekhanika, vol. 21, No. 9, pp. 1240-1249, 1960.

A. Feldbaum, "Dual control theory. ii," Avtomatika i Telemekhanika, vol. 21, No. 11, pp. 1453-1464, 1960.

J. F. Fisac, E. Bronstein, E. Stefansson, D. Sadigh, S. S. Sastry, and A. D. Dragan, "Hierarchical game-theoretic planning for autonomous vehicles," in 2019 International Conference on Robotics and Automation (ICRA). IEEE, 2019, pp. 9590-9596.

J. K. Goeree and C. A. Holt, "Ten little treasures of game theory and ten intuitive contradictions," American Economic Review, vol. 91, No. 5, pp. 1402-1422, 2001.

J. Kong, M. Pfeiffer, G. Schildbach, and F. Borrelli, "Kinematic and dynamic vehicle models for autonomous driving control design," in 2015 IEEE Intelligent Vehicles Symposium (IV). IEEE, 2015, pp. 1094-1099.

H. Kurniawati, D. Hsu, and W. S. Lee, "Sarsop: Efficient point-based pomdp planning by approximating optimally reachable belief spaces." in Robotics: Science and systems, vol. 2008. Zurich, Switzerland., 2008.

N. Li, I. Kolmanovsky, A. Girard, and Y. Yildiz, "Game theoretic modeling of vehicle interactions at unsignalized intersections and application to autonomous vehicle control," in 2018 Annual American Control Conference (ACC), 2018, pp. 3215-3220.

M. H. Lim, C. J. Tomlin, and Z. N. Sunberg, "Sparse tree search optimality guarantees in pomdps with continuous observation spaces," arXiv preprint arXiv:1910.04332, 2019.

J. Mattingley, Y. Wang, and S. Boyd, "Code generation for receding horizon control," in 2010 IEEE International Symposium on Computer-Aided Control System Design, 2010, pp. 985-992.

R. D. McKelvey and T. R. Palfrey, "Quantal response equilibria for normal form games," Games and economic behavior, vol. 10, No. 1, pp. 6-38, 1995.

M. Ono, Y. Kuwata, and J. Balaram, "Joint chance-constrained dynamic programming," in 2012 IEEE 51st IEEE Conference on Decision and Control (CDC). IEEE, 2012, pp. 1915-1922.

T. Phan, L. Belzner, M. Kiermeier, M. Friedrich, K. Schmid, and C. Linnhoff-Popien, "Memory bounded open-loop planning in large pomdps using thompson sampling," in Proceedings of the AAAI Conference on Artificial Intelligence, vol. 33, 2019, pp. 7941-7948.

J. Pineau, G. Gordon, S. Thrun, et al., "Point-based value iteration: an anytime algorithm for pomdps," in IJCAI, vol. 3, 2003, pp. 1025-1032.

J. M. Porta, N. Vlassis, M. T. Spaan, and P. Poupart, "Point-based value iteration for continuous pomdps," Journal of Machine Learning Research, vol. 7, No. Nov, pp. 2329-2367, 2006.

D. Sadigh, S. S. Sastry, S. A. Seshia, and A. Dragan, "Information gathering actions over human internal state," in 2016 IEEE/RSJ International Conference on Intelligent Robots and Systems (IROS), 2016, pp. 66-73.

D. Sadigh, S. Sastry, S. A. Seshia, and A. D. Dragan, "Planning for autonomous cars that leverage effects on human actions." in Robotics: Science and Systems, vol. 2 Ann Arbor, MI, USA, 2016.

S. Särkkä, Bayesian filtering and smoothing. Cambridge University Press, 2013, vol. 3.

W. Schwarting, A. Pierson, J. Alonso-Mora, S. Karaman, and D. Rus, "Social behavior for autonomous vehicles," Proceedings of the National Academy of Sciences, vol. 116, No. 50, pp. 24 972-24 978, 2019.

C. E. Shannon, "A mathematical theory of communication," ACM SIGMOBILE mobile computing and communications review, vol. 5, No. 1, pp. 3-55, 2001.

M. Simaan and J. B. Cruz, "Additional aspects of the stackelberg strategy in nonzero-sum games," Journal of Optimization Theory and Applications, vol. 11, No. 6, pp. 613-626, 1973.

R. Spica, E. Cristofalo, Z. Wang, E. Montijano, and M. Schwager, "A real-time game theoretic planner for autonomous two-player drone racing," Robotics: Science and Systems, 2018.

E. Stefansson, J. F. Fisac, D. Sadigh, S. S. Sastry, and K. H. Johansson, "Human-robot interaction for truck platooning using hierarchical dynamic games," in 2019 18th European Control Conference (ECC). IEEE, 2019, pp. 3165-3172.

L. Sun, W. Zhan, Y. Hu, and M. Tomizuka, "Interpretable modelling of driving behaviors in interactive driving scenarios based on cumulative prospect theory," in 2019 IEEE Intelligent Transportation Systems Conference (ITSC). IEEE, 2019, pp. 4329-4335.

R. Tian, L. Sun, and M. Tomizuka, "Bounded risk-sensitive markov game and its inverse reward learning problem," arXiv preprint arXiv:2009.01495, 2020.

B. Wittenmark, "Adaptive dual control methods: an overview," in Adaptive Systems in Control and Signal Processing 1995, ser. IFAC Postprint Volume, C. Bnysz, Ed. Oxford: Pergamon, 1995, pp. 67-72. [Online]. Available: http://www.sciencedirect.com/science/article/pii/B978008042375350010X.

J. R. Wright and K. Leyton-Brown, "Level-0 meta-models for predicting human behavior in games," in Proceedings of the fifteenth ACM conference on Economics and computation, 2014, pp. 857-874.

J. R. Wright and K. Leyton-Brown, "Predicting human behavior in unrepeated, simultaneous-move games," Games and Economic Behavior, vol. 106, pp. 16-37, 2017. [Online]. Available: http://www.sciencedirect.com/science/article/pii/S0899825617301574.

B. D. Ziebart, A. L. Maas, J. A. Bagnell, and A. K. Dey, "Maximum entropy inverse reinforcement learning." in Aaai, vol. 8. Chicago, IL, USA, 2008, pp. 1433-1438.

P. Auer, N. Cesa-Bianchi, Y. Freund, and R. E. Schapire, "The non-stochastic multiarmed bandit problem," SIAM journal on computing, vol. 32, No. 1, pp. 48-77, 2002.

M. Bellemare, S. Srinivasan, G. Ostrovski, T. Schaul, D. Saxton, and R. Munos, "Unifying count-based exploration and intrinsic motivation," in Advances in Neural Information Processing Systems, 2016, pp. 1471-1479.

M. Bouton, A. Nakhaei, K. Fujimura, and M. J. Kochenderfer, "Cooperation-aware reinforcement learning for merging in dense traffic," arXiv preprint arXiv:1906.11021, 2019.

D. W. Cheng Peng, "Map as the hidden sensor: fast odometry-based global localization," arXiv preprint arXiv:1910.00572, 2019.

M. A. Costa-Gomes and V. P. Crawford, "Cognition and behavior in two-person guessing games: an experimental study," American Economic Review, vol. 96, No. 5, pp. 1737-1768, Dec. 2006.

P. Dayan and B. W. Balleine, "Reward, motivation, and reinforcement learning," Neuron, vol. 36, No. 2, pp. 285-298, 2002.

B. Eysenbach, A. Gupta, J. Ibarz, and S. Levine, "Diversity is all you need: Learning skills without a reward function," arXiv preprint arXiv:1802.06070, 2018.

D. Fox, S. Thrun, W. Burgard, and F. Dellaert, "Particle filters for mobile robot localization," in Sequential Monte Carlo methods in practice. Springer, 2001, pp. 401-428.

T. Haarnoja, A. Zhou, P. Abbeel, and S. Levine, "Soft actor-critic: Off-policy maximum entropy deep reinforcement learning with a stochastic actor," arXiv preprint arXiv:1801.01290, 2018.

R. Houthooft, X. Chen, Y. Duan, J. Schulman, F. De Turek, and P. Abbeel, "Vime: Variational information maximizing exploration," in Advances in Neural Information Processing Systems, 2016, pp. 1109-1117.

D. Isele, "Interactive decision making for autonomous vehicles in dense traffic," in IEEE International Conference on Intelligent Transportation Systems (ITSC), 2019.

(56) References Cited

OTHER PUBLICATIONS

S. Koenig and M. Likhachev, "D* lite," Aaai/iaai, vol. 15, 2002.
T. L. Lai and H. Robbins, "Asymptotically efficient adaptive allocation rules," Advances in applied mathematics, vol. 6, No. 1, pp. 4-22, 1985.
M. Lauri and R. Ritala, "Planning for robotic exploration based on forward simulation," Robotics and Autonomous Systems, vol. 83, pp. 15-31, 2016.
N. Li, D. W. Oyler, M. Zhang, Y. Yildiz, I. Kolmanovsky, and A. R. Girard, "Game theoretic modeling of driver and vehicle interactions for verification and validation of autonomous vehicle control systems," IEEE Transactions on control systems technology, vol. 26, No. 5, pp. 1782-1797, 2017.
E. Lecarpentier, G. Infantes, C. Lesire, and E. Rachelson, "Open loop execution of tree-search algorithms," 2018.
S. Li, N. Li, A. Girard, and I. Kolmanovsky, "Decision making in dynamic and interactive environments based on cognitive hierarchy theory, bayesian inference, and predictive control," arXiv preprint arXiv:1908.04005, 2019.
N. Li, A. Girard, and I. Kolmanovsky, "Stochastic predictive control for partially observable markov decision processes with time-joint chance constraints and application to autonomous vehicle control," Journal of Dynamic Systems, Measurement, and Control, vol. 141, No. 7, 2019.
M. Lopes, T. Lang, M. Toussaint, and P.-Y. Oudeyer, "Exploration in model-based reinforcement learning by empirically estimating learning progress," in Advances in Neural Information Processing Systems, 2012, pp. 206-214.
S. Mohamed and D. J. Rezende, "Variational information maximisation for intrinsically motivated reinforcement learning," in Advances in neural information processing systems, 2015, pp. 2125-2133.
J. E. Naranjo, C. Gonzalez, R. Garcia, and T. De Pedro, "Lane-change fuzzy control in autonomous vehicles for the overtaking maneuver," IEEE Transactions on Intelligent Transportation Systems, vol. 9, No. 3, pp. 438-450, 2008.
G. Ostrovski, M. G. Bellemare, A. van den Oord, and R. Munos, "Count-based exploration with neural density models," in Proceedings of the 34th International Conference on Machine Learning-vol. 70. JMLR.org, 2017, pp. 2721-2730.
D. Pathak, P. Agrawal, A. A. Efros, and T. Darrell, "Curiosity-driven exploration by self-supervised prediction," in International Conference on Machine Learning (ICML), 2017.
D. Perez Liebana, J. Dieskau, M. Hunermund, S. Mostaghim, and Lucas, "Open loop search for general video game playing," in Proceedings of the 2015 Annual Conference on Genetic and Evolutionary Computation. ACM, 2015, pp. 337-344.
M. Przybylski and B. Putz, "D* extra lite: A dynamic a* with search-tree cutting and frontier-gap repairing," International Journal of Applied Mathematics and Computer Science, vol. 27, No. 2, pp. 273-290, 2017.
M. Rickert, A. Sieveding, and O. Brock, "Balancing exploration and exploitation in sampling-based motion planning," IEEE Transactions on Robotics, vol. 30, No. 6, pp. 1305-1317, 2014.

J. Schmidhuber, "Formal theory of creativity, fun, and intrinsic motivation (1990-2010)," IEEE Transactions on Autonomous Mental Development, vol. 2, No. 3, pp. 230-247, 2010.
D. Silver and J. Veness, "Monte-carlo planning in large pomdps," in Advances in neural information processing systems, 2010, pp. 2164-2172.
J. R. Souza, R. Marchant, L. Ott, D. F. Wolf, and F. Ramos, "Bayesian optimisation for active perception and smooth navigation," in 2014 IEEE international conference on robotics and automation (ICRA). IEEE, 2014, pp. 4081-4087.
S. B. Thrun and K. Moller, "Active exploration in dynamic environments," in Advances in neural information processing systems, 1992, pp. 531-538.
R. Tian, S. Li, N. Li, I. Kolmanovsky, A. Girard, and Y. Yildiz, "Adaptive game-theoretic decision making for autonomous vehicle control at roundabouts," in 2018 IEEE Conference on Decision and Control (CDC). IEEE, 2018, pp. 321-326.
R. Tian, N. Li, I. Kolmanovsky, and A. Girard, "Beating humans in a penny-matching game by leveraging cognitive hierarchy theory and bayesian learning," in 2020 Annual American Control Conference (ACC), 2020.
A. Weinstein and M. L. Littman, "Open-loop planning in large-scale stochastic domains," in Twenty-Seventh AAAI Conference on Artificial Intelligence, 2013.
M. Wise, M. Ferguson, D. King, E. Diehr, and D. Dymesich, "Fetch and freight: Standard platforms for service robot applications," in Workshop on autonomous mobile service robots, 2016.
C. Yu, J. Chuang, B. Gerkey, G. Gordon, and A. Ng, "Open-loop plans in multi-robot pomdps," Technical report, Stanford CS Dept, Tech. Rep., 2005.
R. Bellman, "Dynamic programming," Science, vol. 153, No. 3731, pp. 34-37, 1966.
F. Borrelli, A. Bemporad, and M. Morari, Predictive control for linear and hybrid systems. Cambridge University Press, 2017.
R. B. Myerson, Game theory. Harvard university press, 2013.
D. O. Stahl II and P. W. Wilson, "Experimental evidence on players' models of other players," Journal of economic behavior & organization, vol. 25, No. 3, pp. 309-327, 1994.
M. Morari and J. H. Lee, "Model predictive control: past, present and future," Computers & Chemical Engineering, vol. 23, No. 4-5, pp. 667-682, 1999.
D. O. Stahl and P. W. Wilson, "On players' models of other players: Theory and experimental evidence," Games and Economic Behavior, vol. 10, No. 1, pp. 218-254, 1995.
P. Waelti, A. Dickinson, and W. Schultz, "Dopamine responses comply with basic assumptions of formal learning theory," Nature, vol. 412, No. 6842, p. 43, 2001.
Office Action of U.S. Appl. No. 17/175,316 dated Jan. 27, 2023, 39 pages.
Notice of Allowance of U.S. Appl. No. 17/175,316 dated May 9, 2023, 12 pages.

* cited by examiner

SYSTEMS AND METHODS FOR CURIOSITY DEVELOPMENT IN AGENTS

BACKGROUND

Curiosity is closely linked to the learning processes in humans and other animals. For example, it is one way that humans learn more about their environment. Furthermore, it has been hypothesized that curiosity is a key component of general intelligence. In particular as a human and/or animal learns more about its environment, that human and/or animal is increasingly capable of achieving goals in the environment as that intelligence is deployed. Accordingly, curiosity is a desirable attribute.

BRIEF DESCRIPTION

According to one embodiment, a system for curiosity development in an agent located in an environment is provided. The system includes a goal state module, a curiosity module, and a planning module. The goal module is configured to calculate a goal state of a goal associated with the environment. The curiosity module is configured to determine an uncertainty value for the environment and calculate a curiosity reward based on the uncertainty value. The planning module is configured to update a motion plan based on the goal state and the curiosity reward.

According to another embodiment, a method for curiosity development in an agent located in an environment is provided. The method includes calculating a goal state of a goal associated with the environment. The method further includes determining an uncertainty value for the environment. The method also includes calculating a curiosity reward based on the uncertainty value. The method yet further includes updating a motion plan based on the goal state and the curiosity reward.

According to yet another embodiment, a non-transitory computer readable storage medium storing instructions that, when executed by a computer having a processor, cause the computer to perform a method for curiosity development in an agent located in an environment. The method includes calculating a goal state of a goal associated with the environment. The method further includes determining an uncertainty value for the environment. The method also includes calculating a curiosity reward based on the uncertainty value. The method yet further includes updating a motion plan based on the goal state and the curiosity reward.

DETAILED DESCRIPTION

Figure 1:
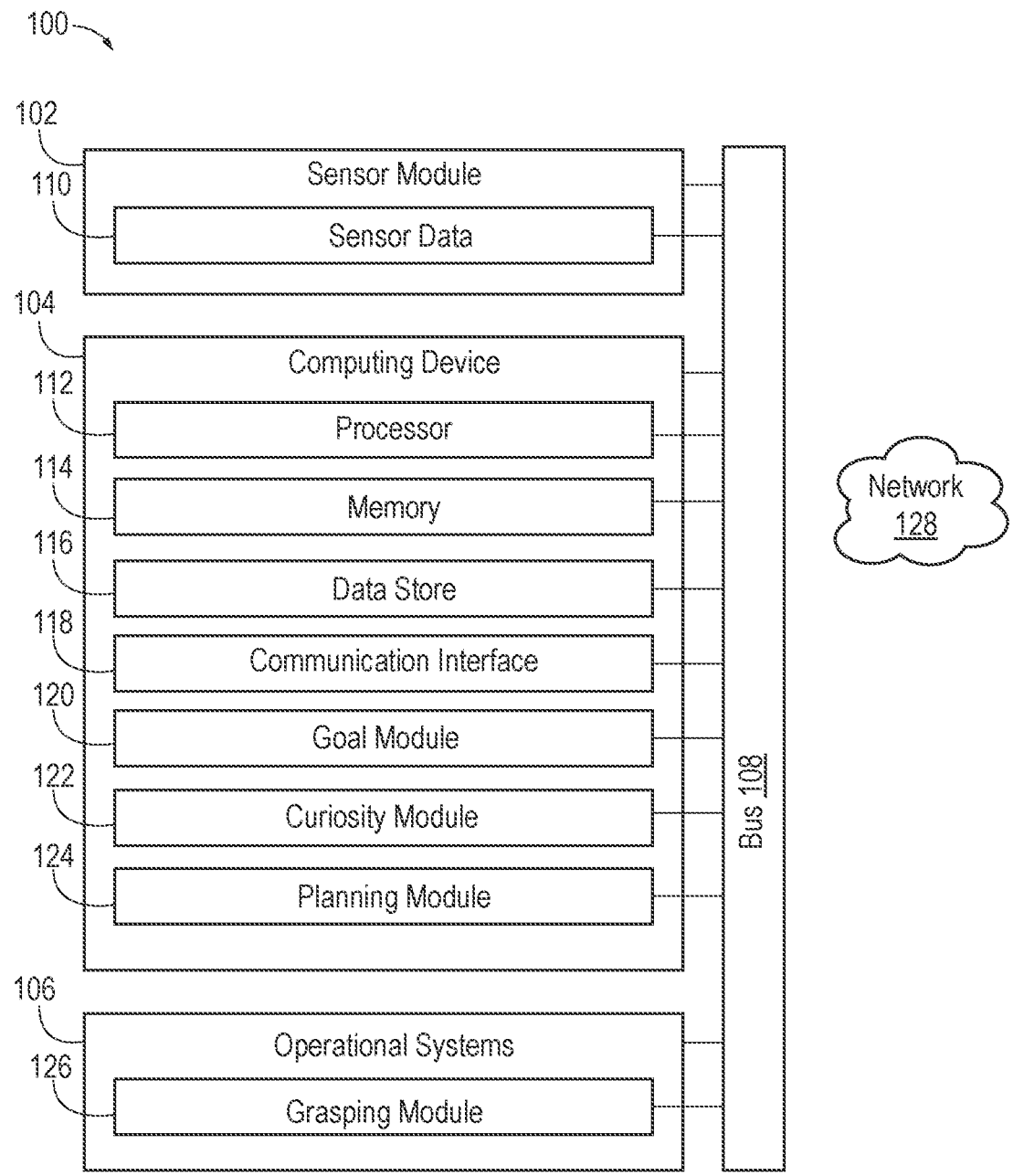
FIG. 1 is an exemplary component diagram of a system for curiosity development in an agent located in an environment, according to one aspect.

The systems and methods herein are directed to developing curiosity in an agent. Uncertain environments impact the planning ability of agents in an environment. By exploring the environment, an agent can efficiently learn about the environment and incorporate that knowledge into the planning process. However, agents are typically deployed to achieve a specific goal. Therefore, to develop curiosity the goal seeking behavior of an agent is augmented with a growing focus on exploration. By balancing the goal seeking behavior with curiosity, the agent may actively see to improve its understanding of its environment. This produces improved performance for the agent to plan, and more generally interact with the environment.

Definitions

The following includes definitions of selected terms employed herein. The definitions include various examples and/or forms of components that fall within the scope of a term and that can be used for implementation. The examples are not intended to be limiting. Furthermore, the components discussed herein, can be combined, omitted, or organized with other components or into different architectures.

"Agent" as used herein is a self-propelled machine that moves through or manipulates an environment. Exemplary agents can include, but is not limited to, robots, vehicles, or other self-propelled machines. The agent may be autonomously, semi-autonomously, or manually operated.

"Agent system," as used herein can include, but is not limited to, any automatic or manual systems that can be used to enhance the agent, propulsion, and/or safety. Exemplary systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a steering system, a transmission system, brake pedal systems, an electronic power steering system, visual devices (e.g., camera systems, proximity sensor systems), an electronic pretensioning system, a monitoring system, a passenger detection system, a suspension system, a seat configuration system, a cabin lighting system, an audio system, a sensory system, an interior or exterior camera system among others.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a bus that interconnects components inside a agent using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication," as used herein, refers to a communication between two or more communicating devices (e.g., computer, personal digital assistant, cellular telephone, network device, vehicle, computing device, infrastructure device, roadside equipment) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface" as used herein can include input and/or output devices for receiving input and/or devices for outputting data. The input and/or output can be for controlling different agent features, which include various agent components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface which can be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. In one embodiment, a database can be stored, for example, at a disk, data store, and/or a memory. A database may be stored locally or remotely and accessed via a network.

"Data store," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Display," as used herein can include, but is not limited to, LED display panels, LCD display panels, CRT display, touch screen displays, among others, that often display information. The display can receive input (e.g., touch input, keyboard input, input from various other input devices, etc.) from a user. The display can be accessible through various devices, for example, though a remote system. The display may also be physically located on a portable device, mobility device, or host.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DR-RAM). The memory can store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software-controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Operable connection," or a connection by which entities are "operably connected," is one in which signals, physical communications, and/or logical communications can be sent and/or received. An operable connection can include a wireless interface, firmware interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Vehicle," as used herein, refers to any moving vehicle that is capable of carrying one or more users and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more users and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more users. Further, the term "vehicle" can include vehicles that are automated or non-automated with predetermined paths or free-moving vehicles.

I. System Overview

Referring now to the drawings, the drawings are for purposes of illustrating one or more exemplary embodiments and not for purposes of limiting the same. FIG. 1 is an exemplary component diagram of an operating environment 100 for developing curiosity in an agent, according to one aspect.

The operating environment 100 includes a sensor module 102, a computing device 104, and operational systems 106 interconnected by a bus 108. The components of the operating environment 100, as well as the components of other systems, hardware architectures, and software architectures discussed herein, may be combined, omitted, or organized into different architectures for various embodiments. The computing device 104 may be implemented with a device or remotely stored.

The computing device may be implemented as a part of an ego agent. For example, the ego agent may be a bipedal, two-wheeled, four-wheeled robot, a vehicle, or a self-propelled machine. The ego agent may be configured as a humanoid robot. The humanoid robot may take the form of all or a portion of a robot. For example, the humanoid robot may take the form of an arm with fingers. The computing device 104 may be implemented as part of a telematics unit, a head unit, a navigation unit, an infotainment unit, an electronic control unit, among others of the ego agent. In other embodiments, the components and functions of the computing device 104 can be implemented, for example, with other devices 730 (e.g., a portable device) or another device connected via a network (e.g., a network 128). The computing device 104 may be capable of providing wired or wireless computer communications utilizing various protocols to send/receive electronic signals internally to/from components of the operating environment 100. Additionally, the computing device 104 may be operably connected for internal computer communication via the bus 108 (e.g., a Controller Area Network (CAN) or a Local Interconnect Network (LIN) protocol bus) to facilitate data input and output between the computing device 104 and the components of the operating environment 100.

Figure 2:
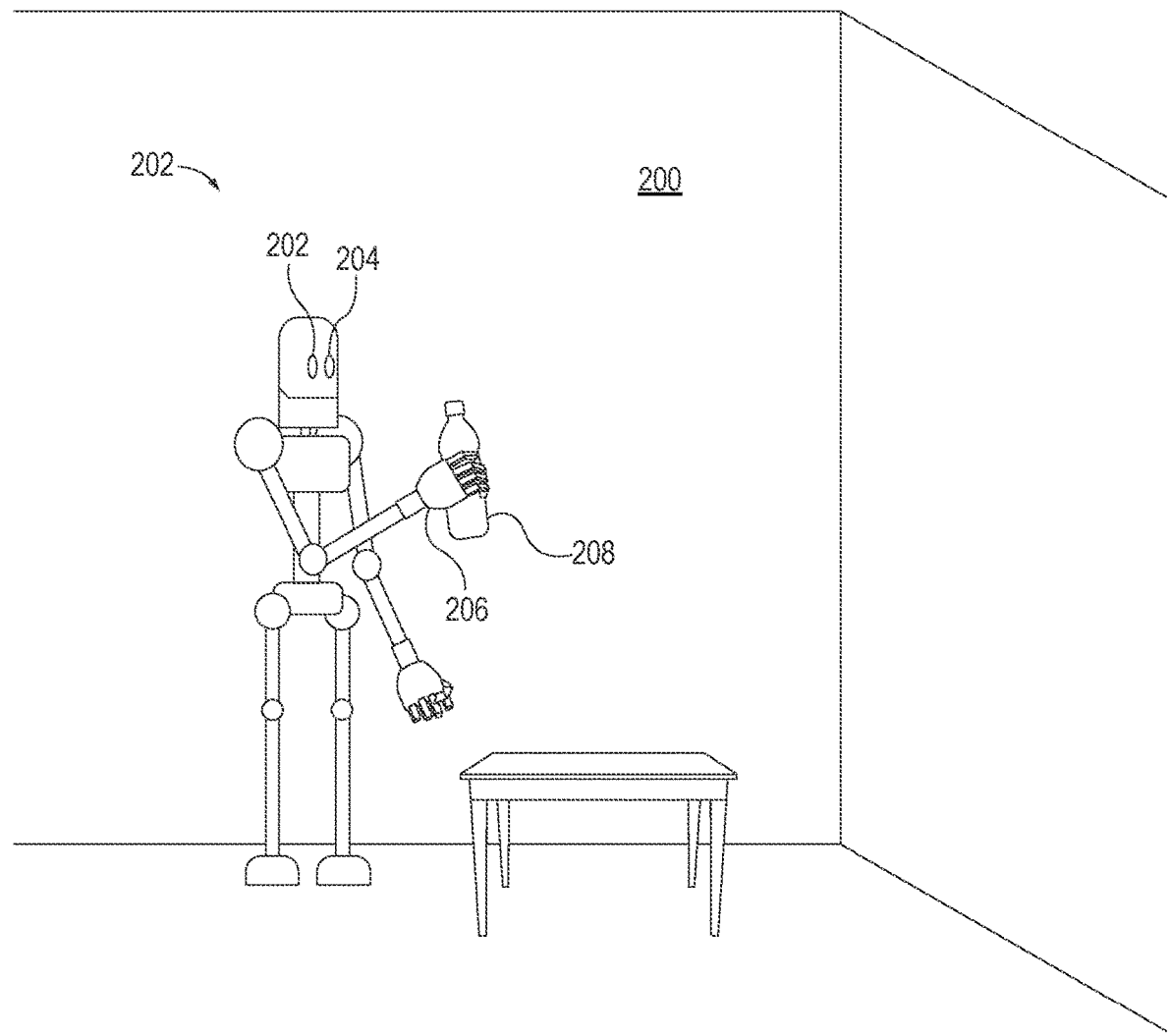
FIG. 2 is an exemplary agent environment of a system for curiosity development in an agent located in an environment, according to one aspect.

In some embodiments, the ego agent may be the agent 202 in the environment 200 shown in FIG. 2. The agent 202 may have a number of sensors. For example, the agent 202 may include, but not be limited to, a depth sensor 204, an image sensor 206, and a force sensor 208. The depth sensor 204, the image sensor 206, and the force sensor 208 receive data from an environment 200, such as an object 208. The sensor module 102 receives, provides, and/or senses information associated with the agent 202, an object 208, the operating environment 100, an environment of the agent 202, and/or the operational systems 106. For example, the sensor module 102 may receive depth data, image data, and tactile data from the sensors. The sensor module 102 may also receive depth data from the depth sensor 204, image data from the image sensor 206, and the tactile data from the force sensor 208. The computing device 104 receives the depth data, the image data, and the tactile data from the sensor module 102.

Accordingly, the sensors 204-208 and/or the sensor module 102 are operable to sense a measurement of data associated with the agent 202, the operating environment 100, the object 208, the environment, and/or the operational systems 106 and generate a data signal indicating said measurement of data. These data signals can be converted into other data formats (e.g., numerical) and/or used by the sensor module 102, the computing device 104, and/or the operational systems 106 to generate other data metrics and parameters. The sensors can be any type of sensor, for example, acoustic, electric, environmental, optical, imaging, light, pressure, force, thermal, temperature, proximity, gyroscope, and accelerometers, among others. Furthermore, a single sensor, such as the depth sensor 204, may be described, that includes multiple sensors and/or sensing components.

The computing device 104 includes a processor 112, a memory 114, a data store 116, and a communication interface 118, which are each operably connected for computer communication via a bus 108 and/or other wired and wireless technologies. The communication interface 118 provides software and hardware to facilitate data input and output between the components of the computing device 104 and other components, networks, and data sources, which will be described herein. Additionally, the computing device 104 also includes a goal module 120, a curiosity module 122, and a planning module 124, for developing curiosity for an agent facilitated by the components of the operating environment 100.

The goal module 120, the curiosity module 122 and/or the planning module 124, may be artificial neural networks that act as a framework for machine learning, including deep learning. For example, the goal module 120, the curiosity module 122, and/or the planning module 124 may be a convolution neural network (CNN). In one embodiment, the goal module 120, the curiosity module 122, and/or the planning module 124 may include a conditional generative adversarial network (cGAN). In another embodiment, the goal module 120, the curiosity module 122, and/or the planning module 124 may include an input layer, an output layer, and one or more hidden layers, which may be convolutional filters.

The computing device 104 is also operably connected for computer communication (e.g., via the bus 108 and/or the communication interface 118) to one or more operational systems 106. The operational systems 106 can include, but are not limited to, any automatic or manual systems that can be used to enhance the agent 202, operation, and/or safety. The operational systems 106 may dependent on the implementation. For example, the operational system may include a grasping module 126. The grasping module 126 monitors, analyses, operates the agent 202 to some degree. As an example, the grasping module 126 monitors, analyses, and calculates grasp information and facilitates features like a determination of how to hold the object 208, an assessment of the surface properties of the object 208, a calculation of the force needed to hold the object 208, etc.

The operational systems 106 also include and/or are operably connected for computer communication to the sensor module 102. For example, one or more sensors of the sensor module 102 may be incorporated with the grasping module 126 to monitor characteristics of the environment 200 or the agent 202.

The sensor module 102, the computing device 104, and/or the operational systems 106 are also operatively connected for computer communication to the network 128. The network 128 is, for example, a data network, the Internet, a wide area network (WAN) or a local area (LAN) network. The network 128 serves as a communication medium to various remote devices (e.g., databases, web servers, remote servers, application servers, intermediary servers, client machines, other portable devices). Using the system and network configuration discussed above, anomalous events can be detected. Detailed embodiments describing exemplary methods using the system and network configuration discussed above will now be discussed in detail.

As discussed above, giving the agent 202 the ability to be curious about its environment 200 could improve the agent's understanding and aid in future planning. In particular, being goal oriented, the agent 202 having artificial curiosity can explore as needed to better achieve a goal. Furthermore, a balance between a goal and curiosity can be achieved without repeated expensive trials and lapses in safety, as the agent 202 learns more about its environment 200. For example, as a predictive control scheme, the systems and methods described herein may be widely applied to control systems with state and control constraints. Therefore, a finite sequence of open-loop control actions by solving a finite horizon optimal control problem online at each time instant, using an approximate system dynamics. Accordingly, the agent 202 may generally apply a first action in a sequence, measure the new state, and re-plan.

II. Methods for Curious Agents in Uncertain Environments

Figure 3:
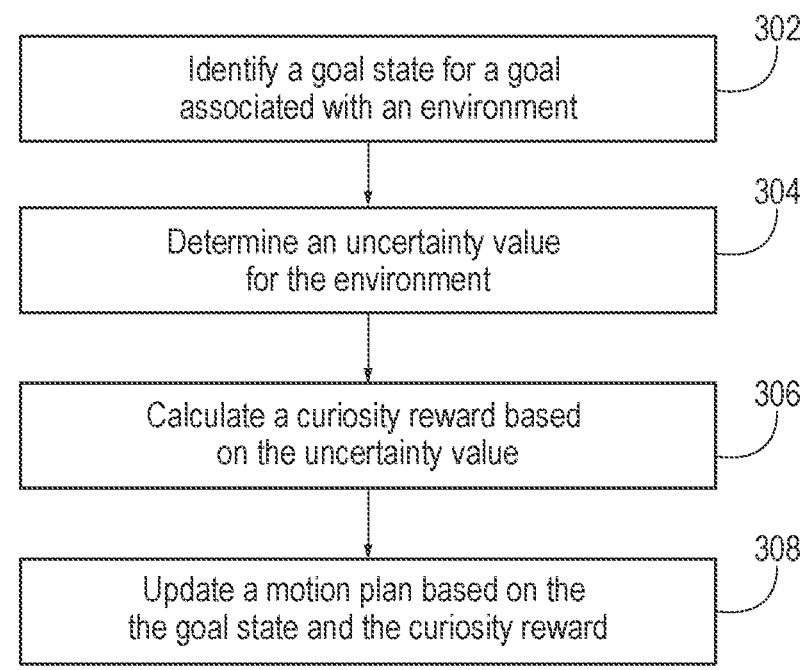
FIG. 3 is an exemplary process flow of a method for curiosity development in an agent located in an environment, according to one aspect.

Referring now to FIG. 3, a method 300 for agent 202 exploration of the environment 200 will now be described according to an exemplary embodiment. FIG. 3 will also be described with reference to FIGS. 1, 2, and 4-7. For simplicity, the method 300 will be described as a sequence of elements, but it is understood that the elements of the method 300 can be organized into different architectures, blocks, stages, and/or processes.

At block 302 the method 300 includes the goal module 120 identifying a goal state for a goal associated with the environment 200. The goal state may be based on user input. For example, a user (not shown) may request that the agent 202 retrieve the object 208, move to a location, or, in a vehicle embodiment, change lanes. In some embodiments, the goal state may be based on a current localization of the agent 202. However, suppose that the agent 202 is placed in an unknown location of the environment 200. The agent 202 may identify the goal state, before attempting to determine a current location of the agent 202 due to negative performance effects that may be caused by calculating the current location.

The goal state may also be based on a behavior model of the agent 202. For example, the agent 202 may be governed by a Partially Observable Markov Decision Process (POMDP) defined by tuple $<\mathcal{S}, \mathcal{A}, \mathcal{T}, \mathcal{R}, \Omega, \mathcal{O}>$, where $\mathcal{S}$ is a finite state space, $\mathcal{A}$ is a finite action space, $\mathcal{T}: \mathcal{S} \times \mathcal{A} \times \mathcal{S} \to [0,1]$ is a state transition probability function, $\mathcal{R}: \mathcal{S} \times \mathcal{A} \to \mathbb{R}$ is a reward function, $\Omega$ is a finite observation set, and $\mathcal{O}: \mathcal{S} \times \Omega \to [0,1]$ is an observation probability function. The goal state may be aligned with the reward function. For example, the reward function may define an amount of reward associated with a series of activities that can be performed by the agent 202. The agent 202 may identify the goal state to maximize the amount of the reward. The goal state may also be identified on a planning horizon, for example, the amount of reward may be based on an amount of time from an initial action. In another example, the goal state also be based on completion of an aggregate activity.

Here, suppose that the agent is placed at an unknown location in a known environment 200. The goal state may be that the agent 202 needs to go to a desired location, but is uncertain about its environment 200. The goal state is composed of two parts: $s=(s^1, \xi) \in \mathcal{S}$. The first part $s^1=(x, y, \theta) \in \mathcal{S}^1$ is the kinematics of the agent 202 and is modeled:

$$\begin{Bmatrix} x_{t+1} \\ y_{t+1} \\ \theta_{t+1} \end{Bmatrix} = f(s_t^1, a_t) = \begin{Bmatrix} x + a^1 \\ y + a^2 \\ \theta + a^3 \end{Bmatrix},$$

where $a_t=(a^1, a^2, a^3) \in \mathcal{A}$ is the action of the agent 202 and is composed by the desired displacements along the x-axis, y-axis, and heading angle. The second part of the goal state $\xi \in \mathcal{X}$ is a feature vector containing key information about the environment 200 which can be measured by the sensor module 102.

Formally, We define feature vector as follows:

$$\xi t = \{\xi ti\}, i=1, \ldots, 5,$$

where $\xi t$ is an indicator, taking 1 if the cell i is occupied, and 0 otherwise, based on the laser scan at t. The feature vector is observable to the agent 202 (i.e., $o=\xi$, $o \in \Omega = \mathcal{X}$), and we define the observation probability function as follows:

$$O(s,o) = \begin{cases} \delta & \text{if } o = \xi, \\ \frac{1-\delta}{|\Omega|} & \text{otherwise,} \end{cases}, \forall_S \in \mathcal{S}, \forall_O \in \Omega$$

where $\delta \in [0,1]$ is a tuning parameter used to account for the sensory noise. The state transition probability function may be modeled as follows:

$$T(s,a,s') = \begin{cases} \delta' & \text{if } o = \xi, \text{ if } s' = f(s,a), \\ \dfrac{1-\delta'}{|S|} & \text{otherwise,} \end{cases}, \forall s \in S, \forall a \in \mathcal{A}$$

where $\delta' \in [0,1]$ is a tuning parameter used to account for the low-level control error.

At block 304 the method 300 includes determining an uncertainty value for the environment. The uncertainty value is assessment of the sensor data 110 and the current knowledge that the agent 202 has about the environment 200. For example, suppose that at agent 202 has an uncertainty value that is indicative of a 95% confidence of the agent 202 being located at a first location. When the agent 202 moves to a second location, the uncertainty value associated with the second value may be 80%, as uncertainty compounds. Therefore, the uncertainty value may be based on uncertainty values associate with previous actions of the agent.

As discussed above, the uncertainty value may be based on the sensor accuracy of the sensor data 110. For example, the depth sensor 204 may be 99% accurate within a first radius of the agent. Beyond that first radius extending to a second radius, the depth sensor 204 may be accurate to 80%. Therefore, the uncertainty value may be based on sensor accuracy based on the distance of the object 208 being sensed. The uncertainty value may further be based on the type of the object 208 being sensed. For example, while the agent 202 may assess a higher uncertainty value for a solid object, the agent 202 may determine a lower uncertainty value for a liquid object.

At block 306 the method 300 includes the curiosity module 122 calculating a curiosity reward based on the uncertainty value. The goal state function may be based on the notation $\mathcal{T}'':\mathcal{B} \times \mathcal{A} \to \mathcal{B}$ which is a belief state transition function. The notation $R': \mathcal{B} \times \mathcal{A} \to \mathbb{R}$ is a reward function on belief states and it is defined as follows:

$$\mathcal{R}'(b,a) = \Sigma_{s \in S} b(s) R(s,a).$$

$\pi^*:\mathcal{B} \times \mathcal{A} \to [0,1]$ denotes the optimal policy of the B-MDP, and it is defined $\pi^*(b,a) := \mathbb{P}(a_t = a | b_t = b)$ for $\forall b \in \mathcal{B}$, $\forall a \in \mathcal{A}$ and is modeled:

$$\Pi_*(b,a) = \frac{\exp(Q^*(b,a))}{\Sigma_{a' \in A} \exp(Q^*(b,a'))}.$$

The state-action value function, $Q^*:\mathcal{A} \times \mathcal{B} \to \mathbb{R}$, represents the expected total future reward and is defined: $Q^*(b, a) = \mathcal{R}'(b,a) + \gamma a m, \in A a x[Q^*(T'(b,a),a')]$, (3) where $\gamma$ is a discount factor. At each time instant t, the agent applies the action $a_t \sim A^*(a_t$ is sampled from $\pi^*)$. Then after the time instant t, the agent receives an observation $o_t \in \Omega$ induced by the action $a_t$ and updates its belief state at the time instant t+1 following:

$$b_{t+1} = \rho(b_t, a_t, o_t),$$

where $\rho: \mathcal{B} \times \mathcal{A} \times \Omega \to \mathcal{B}$ is a function that maps a belief state $b_t \in \mathcal{B}$, action $a_t \in \mathcal{A}$, and observation $o_t \in \Omega$ to belief state $b_{t+1} \in \mathcal{B}$. Each element in $b_{t+1}$ may be computed using the recursive Bayesian inference formula:

$$b_{t+1}(s) = \frac{O(s,0) \Sigma (T(s',a,s) b_t(s'))}{\Sigma (O(s',0) \Sigma (T(s',a,s') b_t(s')))}.$$

For example, continuing the example from above, the reward function R of the agent 202 may be:

$$R(s,a) = \Sigma_{s' \in} \mathcal{S}(T(s',a,s') b_t(s')), \forall s \in \mathcal{S}, \forall a \in \mathcal{A}$$

$$r(s') = -|x - x_g| - |y - y_g| - 1 \cdot \theta - \theta_g| - 10 \cdot \mathbb{I}_{colli}(s')$$

where $(x_g, y_g, \theta_g)$ denotes the goal state of the agent 202 and $\mathbb{I}_{colli}(s')$ is a binary indicator, taking 1 if the goal state is in an occupied cell, and taking 0 otherwise. The reward function encourages the agent 202 to reach the goal state efficiently while avoiding unsafe states. For example, suppose that the action space of the agent 202 is $\mathcal{A}$ the planning horizon is N=5, the reward discount factor is 0.9, the value of the parameter $\alpha$ in is $\alpha$=10, the values of the parameters $\delta$ and $\delta'$ in and are 0.8 and 0.9, respectively.

The curiosity reward is the accumulative belief state entropy over the planning horizon. The local Q-value function is defined:

$$\bar{Q}(b,a) = \max \varepsilon(N \prod \Sigma = 01 \gamma \tau \mathcal{R}(b\tau|t, a\tau|t) + \lambda(b)$$

$$N \tau \Sigma = 11 \gamma \tau \mathcal{C}(b\tau|t)|a0|t=a, b_{0|t}=b),$$

where the function $\mathcal{C}: \mathcal{B} \to \mathbb{R}$ measures the negative entropy of a belief state, and the function $\lambda: \mathcal{B} \to \mathbb{R}$ is a regulation function that trades off curious exploration and exploitation:

$$\mathcal{C}(b) = \Sigma_{s \in S} b(s) \log(b(s)), \forall b \in \mathcal{B},$$

$$\lambda(b) = \alpha \text{ abs}(\mathcal{C}(b))$$

where $\alpha > 0$ is a tuning parameter. The second summation of is the confidence of the expected knowledge gained when taking a given trajectory, and $\lambda(b)$ weights the importance of this knowledge by the uncertainty. The ego agent's policy with curious exploration at each time t is then modeled:

$$\bar{A}(b,a) = \frac{\exp(\bar{Q}(b,a))}{\Sigma \exp(Q^-(b,a'))}.$$

At block 308 the method 300 includes the planning module 124 update a motion plan based on the curiosity reward. Continuing the example from above, once $\bar{A}$ is obtained, the agent 202 applies an action sampled from $\bar{A}$ updates $b_{t+1}$, and solves for $\bar{A}$. In this manner, the agent 202 may plan. For example, continuing the example from above, suppose that the agent acts in accordance with a POMDO model ($\mathcal{S}$, $\mathcal{S}$, T, $\mathcal{R}$, $\Omega$, $\mathcal{O}$), planning horizon N, discount factor $\gamma$, and parameter $\alpha$, then $b_0$ may be initialized. A suboptimal policy $\tilde{A}t$ following equation is calculated and $a_t \sim \tilde{A}$ is executed, such that a new observation $o_t$ is collected. Because the agent 202 has acquired new information about the environment 200, the agent updates the belief state $b_t$ thereby changing the way that the agent 202 interacts in the environment 200. Thus, the agent may update a motion plan that defines the manner in which the agent 202 interacts with the environment 200. For example, the motion plan may be updated to cause the grasping module 126 to cause the agent 202 to handle the object 210 with the force sensor 206. Accordingly, when the curiosity reward outweighs the reward associated with the goal state, the motion plan may be updated to cause the agent 202 to collect a new observation.

To predict the belief state $b\tau|t$ along the planning horizon, $\tilde{Q}$ may rely on the belief transition function $\mathcal{T}'$. For example, suppose that $\mathcal{T}'$ is defined as $\mathcal{T}'(b\tau|t, a\tau|t) = b\tau+1|t$, where each element in $b\tau+1|t$ can be computed recursively as:

$$b\tau+1|t(s|b\mathcal{A}_{1t}=b, a\mathcal{A}_{1t}=a) = \Sigma_{o \in \Omega}(\rho(s|b,a,o)O^\sim \tau b, |at(o))$$

where the notation $O\mathcal{A}_{1t}^{-b,a} := [\mathbb{P}(o\tau|t=o_1|b\tau|t=b, a\mathcal{A}_{1t}=a), \ldots, \mathbb{P}(O\tau|t=o|\Omega||b\tau|t=b, a\tau|t=a)]^T$ is a vector representing the predicted observation distribution after the time instant t+T, given the belief state and the action of the agent 202 at the time instant t+T. In some embodiments predicting the belief state along the planning horizon may include utilizing a Monte Carlo strategy to sample observations from the predicted observation probability distribution and approximate $b\tau+1|t$ as follows:

$$b\tau+1|t(s|b\mathcal{A}_{1t}=b, a\mathcal{A}_{1t}=a) = \Sigma_{k=1, 0_k \sim \delta^n} \rho(s|b,a,ok)$$
$$O^\sim \tau b, |at(ok))$$

$$b_T+1|t = \frac{b_{\mathcal{A}+1|t}}{\|b_{\mathcal{A}+1|t}\|_1}$$

Therefore, based on the belief state and the curiosity reward are used to calculate an expected accumulated reward. The expected accumulated reward is based on both the goal state and the curiosity reward. Accordingly, the agent 202 can balance the future reward of different goal states with curiosity rewards so that the agent can determine which actions will result in the agent achieving the largest rewards.

Figure 4:
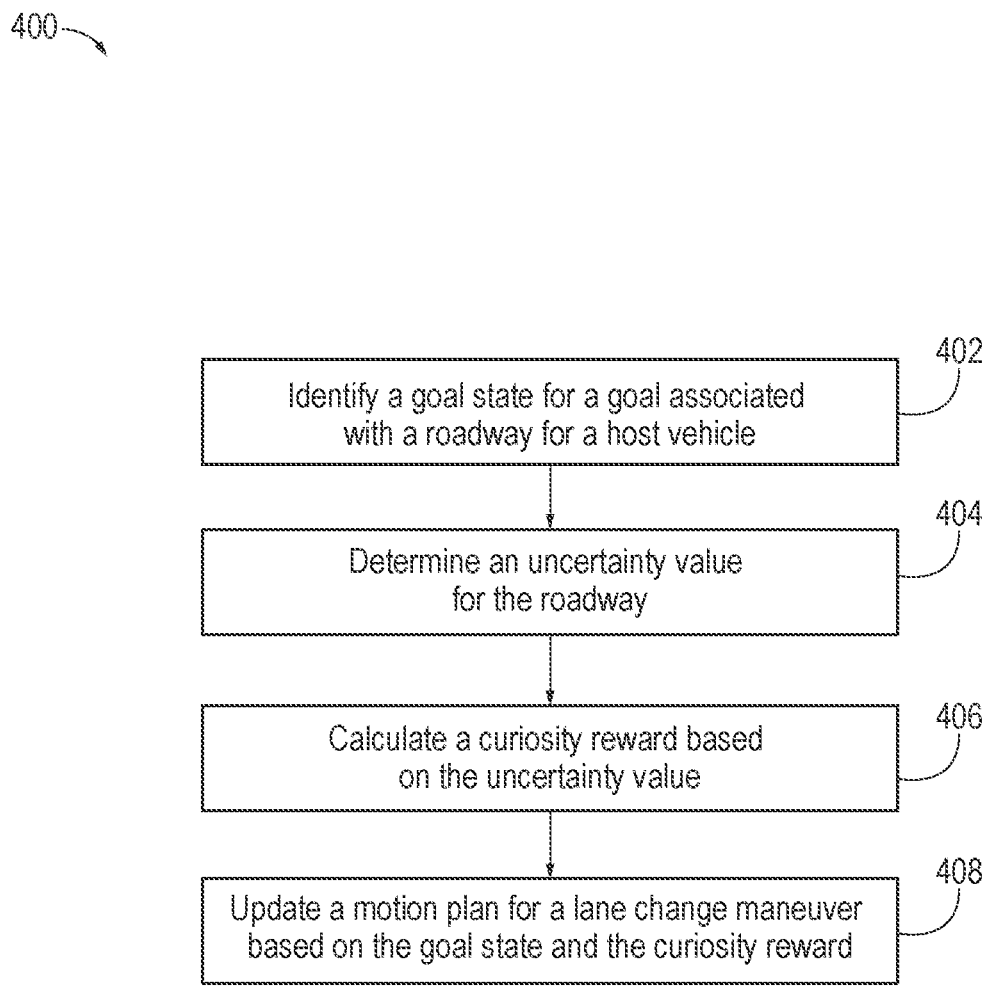
FIG. 4 is an exemplary process flow of a method for curiosity development in an agent located in an environment, according to one aspect.

Referring now to FIG. 4, a method 400 for agent exploration in a vehicle embodiment will now be described according to an exemplary embodiment. FIG. 4 will also be described with reference to FIGS. 1, 2, and 4-6. For simplicity, the method 400 will be described as a sequence of elements, but it is understood that the elements of the method 400 can be organized into different architectures, blocks, stages, and/or processes.

Figure 5:
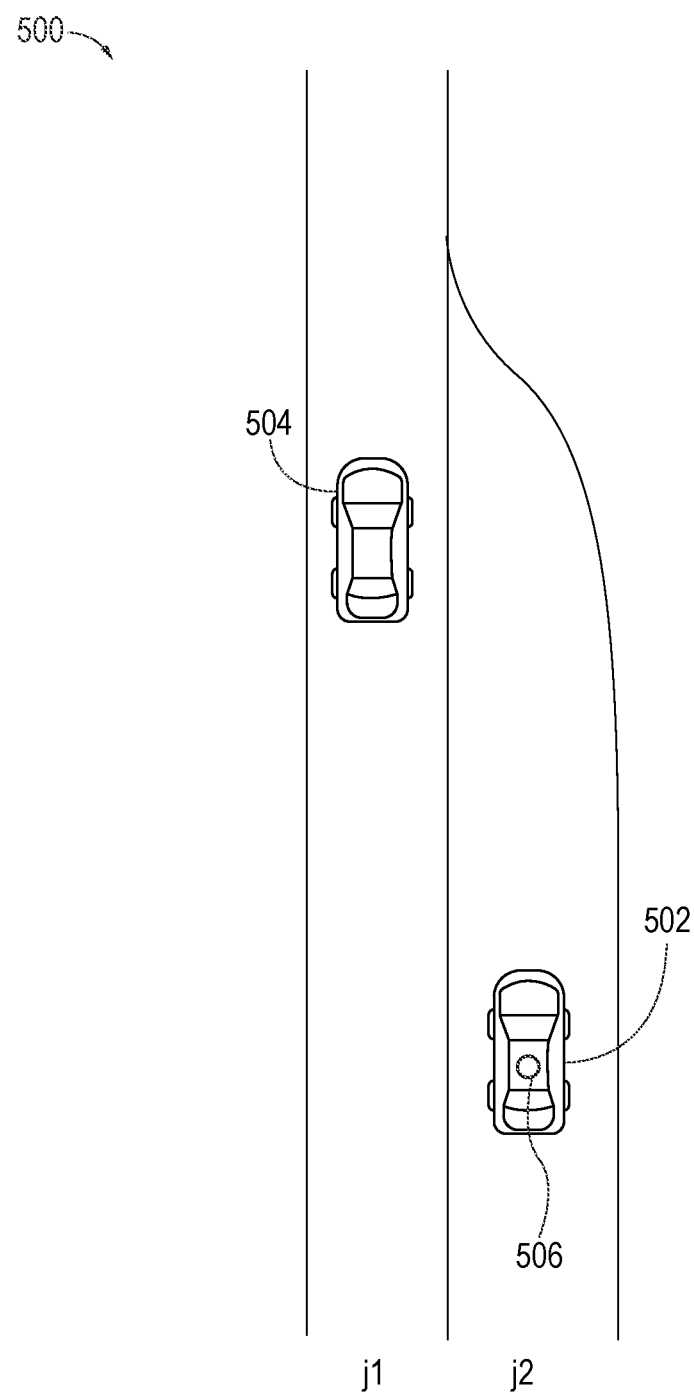
FIG. 5 is an exemplary agent environment of a system curiosity development in an agent located in an environment, according to one aspect.

Suppose that the agent 202 on a roadway 500 as host vehicle 502. The roadway 500 can be any type of road, highway, freeway, or travel route. In FIG. 5, the roadway 500 includes two lanes with vehicles traveling in the same longitudinal direction, namely, a lane $j_1$ and a lane $j_2$, however, it is understood that the roadway 500 can have various configurations not shown in FIG. 5 and can have any number of lanes. The host vehicle 502 may share the roadway with proximate vehicles such as the proximate vehicle 504. A proximate vehicle is a vehicle that is within communications and/or sensor range of the host vehicle 502. Consider an embodiment in which the host vehicle 502 is attempting to merge from the lane $j_2$ to the lane $j_1$ where the proximate vehicle is positioned. While the examples herein will focus on a single proximate vehicle, more proximate vehicles and/or other types of obstacles may also be modeled.

At block 402 the method 400 includes a goal module identifying a goal state for a goal associated with the roadway 500 for the host vehicle 502. Suppose that the goal state is based on a planned maneuver of the host vehicle such as a turn, lane change, moving to an exit or entrance ramp, etc. Continuing the example from above, the merging scenario, the state is composed of two parts s=($\tilde{s}$, θ): s=($\tilde{s}$, $\tilde{s}$)∈ $\tilde{S}$ is a collection of the physical states of the ego vehicle and the traffic vehicle and represents the state of the merging scenario; θ∈Θ parameterizes the traffic vehicle's decision strategy. We define the state evolution using a discrete-time model:

$$\tilde{s}' = \mathcal{F}(\tilde{s}, a_t^e, a_t^h)$$

where $\tilde{s} = (x^i, y^i, v^i)$, $i \in \mathcal{P} = \{e, h\}$, denotes the kinematics of the host vehicle 502, and may be modeled using a unicycle model. The action of the host vehicle 502 is $a^i = (a^{i,1}, a^{i,2}) \in \mathcal{S}^i$ with $a^{i,1}$ denoting the longitudinal acceleration and $a^{i,2}$ denoting the lateral acceleration.

At block 404 the method 400 includes the curiosity module 122 determining an uncertainty value for the behavior parameter. In a similar manner as described above with respect to block 304, the behavior parameter may be identified based on the sensor data 110. The host vehicle 502 may include host vehicle sensors such as a host vehicle sensor 506. The host vehicle sensor 506 can include, but is not limited to, image sensors, such as cameras, optical sensors, radio sensors, etc. mounted to the interior or exterior of the host vehicle 202 and light sensors, such as light detection and ranging (LiDAR) sensors, radar, laser sensors etc. mounted to the exterior of the host vehicle 502. Further, the host vehicle sensor 506 may include sensors external to the host vehicle 502 (accessed, for example, via the network 128), for example, external cameras, radar and laser sensors on other vehicles in a vehicle-to-vehicle network, street cameras, surveillance cameras, among others.

In another embodiment, the host vehicle 502 may be able to measure position (i.e., :=$\tilde{s}$), and we define the observation function as a one-hot vector encoding:

$$O(s, o) = \begin{cases} 1 & \text{if } \tilde{s} = o, \\ 0 & \text{otherwise,} \end{cases}$$

We define the state transition function as follows:

$$\mathcal{T}(s', a, s) = \mathcal{P}(s_{t+1} = s | s_t = s', a_t^e = a) =$$
$$\sum_{a \in A^h} (\mathcal{I}(\tilde{s} = \mathcal{F}(\tilde{s}, a, a')) \text{ and } \ddot{e} = \ddot{e}') \mathcal{P}(a_t^h = a' | s_t = s')),$$
$$\forall s, s' \in \mathcal{S}, \forall a \in \mathcal{A}^e$$

where $\mathbb{I}(\bullet)$ is an indicator function (taking 1 if the event ($\bullet$) is true, and 0 otherwise), $\tilde{s}$ is the first component in s, 1. Though we consider two vehicles, the method can be extended to multivehicle interactions at a greater computational cost. $\tilde{s}$ is the first component in s', θ is the second component in s, and θ' is the second component in s'. Intuitively, the indicator function governs that the state transition follows the dynamic model (13) and ensures the consistency of θ during transitions. The full derivation is in App. VII-B. The notation $\mathbb{P}(a_t^h = a' | s_t = s') = \pi h, \theta'(s', a^h)$ represents a stochastic policy of the traffic vehicle. In this work, we adopt a gametheoretic approach to model traffic vehicle decision-making.

In some embodiments, the uncertainty value may be based on a user profile associated with the host vehicle 502. For example, the host vehicle may predict a user action based on historical data and calculate the uncertainty value for the behavior parameter based on the user profile. In another embodiment, the uncertainty value may be based on the observed behavior of the proximate vehicle 504. For example, if the proximate vehicle 504 is exceeding the posted speed limit by a predetermined amount and/or repeatedly changing lanes, the uncertainty value may be based on the likelihood that the proximate vehicle 504 behaves aggressively.

At block 406 the method 400 includes the curiosity module 122 calculating a curiosity reward based on the uncertainty value. The reward functions of the host vehicle 502 and the proximate vehicle 504 used to define the level-k policies are:

$$R^i(s_t, a_t^i, a_t^j) = w^T \Phi^i(s_{t+1})$$

where $i \in \mathcal{R}$, $s_{t+1}$ is obtained based on the dynamic model, $w=[1,10]^T$ is a weight vector, $\Phi^i(s_{t+1})=[(\varphi i,1 (s_{t+1}), \varphi i,2 (s_{t+1})]^T$ is a feature vector defined:

$$\varphi i,1(s) = -|x_{goal} - x^i| - |y_{goal} - y^i|,$$

$$\varphi i,2(s) = \mathbb{I}_{colli}(s)$$

where feature $\varphi i,1$ characterizes the behavior of the host vehicle 502 in reaching its target location, and feature $\varphi i,2$ characterizes the safe status of the vehicle, taking −1 if two vehicle collide, and 0 otherwise. The ego agent's B-MDP reward function is defined:

$$\mathcal{R}(s, a^e) = \mathbb{E}(R^e(s, a^e, a^h | a^h \sim \pi h, \theta)),$$

where $a^h$ is sampled from $\pi h, \theta$ and $\theta$ is a component in s. The action space of the host vehicle 502 is $\mathcal{S}^e = \{(-6,0), (0,0), (6,0), (0,3)\}$ m/s², and that of the proximate vehicle 504 is $\mathcal{S}^h = \{(-6,0), (0,0), (6,0)\}$ m/s². The planning horizon is N=5, the reward discount factor is 0.9, the value of the parameter α in (8b) is Reject=10, and the sampling time Δt is chosen as 0.5 s.

The curiosity reward provides a counterbalance to the goal oriented agent, thereby imbuing the host vehicle 502 with curiosity. Accordingly, at block 408, the method 400 includes the planning module 124 updating a motion plan based on the goal state and the curiosity reward. Suppose the host vehicle 502 predicts that, by accelerating, the host vehicle 502 can receive more information of the proximate vehicle 504. The curiosity reward effectively guides the ego agent to reduce the ambiguity of the environment 200.

The systems and methods described herein provide an agent 202 with artificial curiosity, enabling the agent 202 to explore the environment 200 as needed to better achieve a goal. Therefore, the agent 202 is able to efficiently navigate to a goal even when uncertain about the environment 200. In some embodiments, the systems and methods described herein utilize model-based open-loop planning which lends itself to reduce repeated trials, which may be expensive, and safety is critical. Accordingly, the agent 202 of the embodiments may be robots, autonomous vehicles, or other self-propelled devices that plan based on their environment 200.

Figure 6:
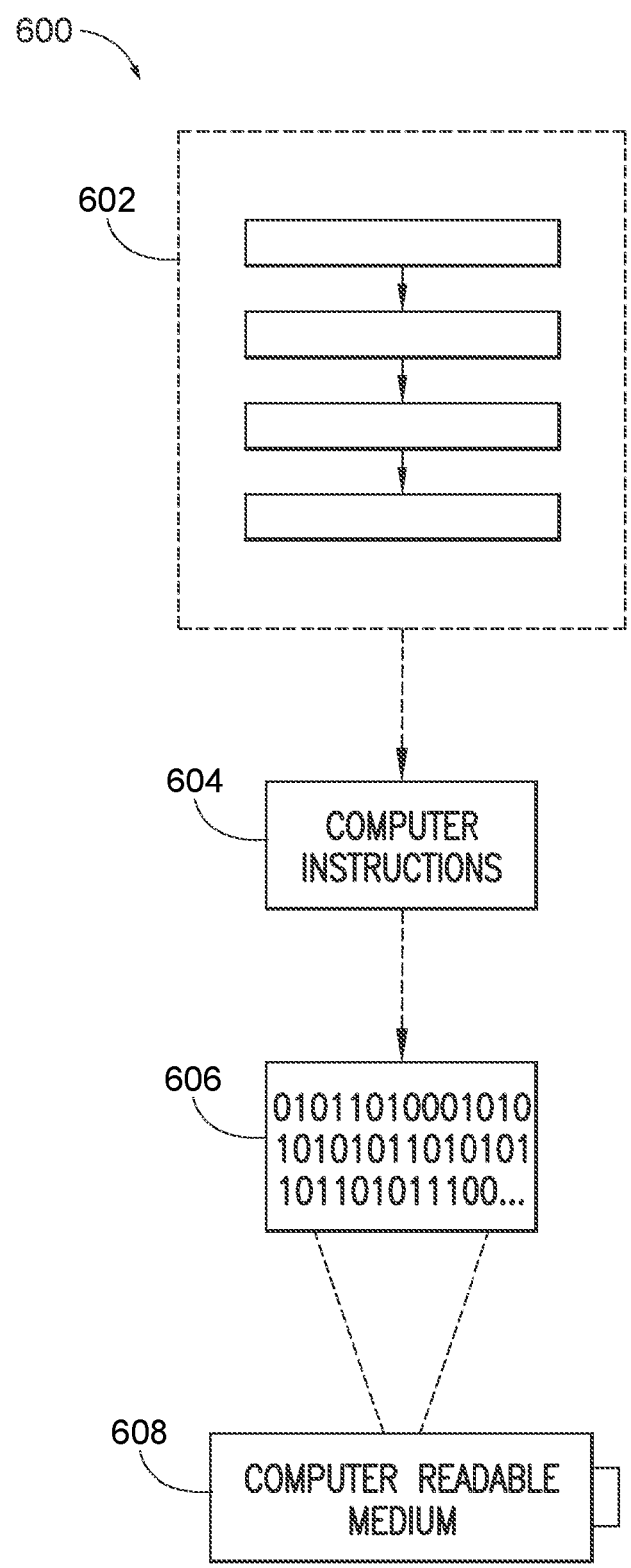
FIG. 6 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 6, wherein an implementation 600 includes a computer-readable medium 608, such as a CD-R, DVD-R, flash drive, a platter of a hard disk drive, etc., on which is encoded computer-readable data 606. This encoded computer-readable data 606, such as binary data including a plurality of zero's and one's as shown in 606, in turn includes a set of processor-executable computer instructions 604 configured to operate according to one or more of the principles set forth herein. In this implementation 600, the processor-executable computer instructions 604 may be configured to perform a method 602, such as the method 300 of FIG. 3 and/or the method 400 of FIG. 4. In another aspect, the processor-executable computer instructions 604 may be configured to implement a system, such as the operating environment 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 7:
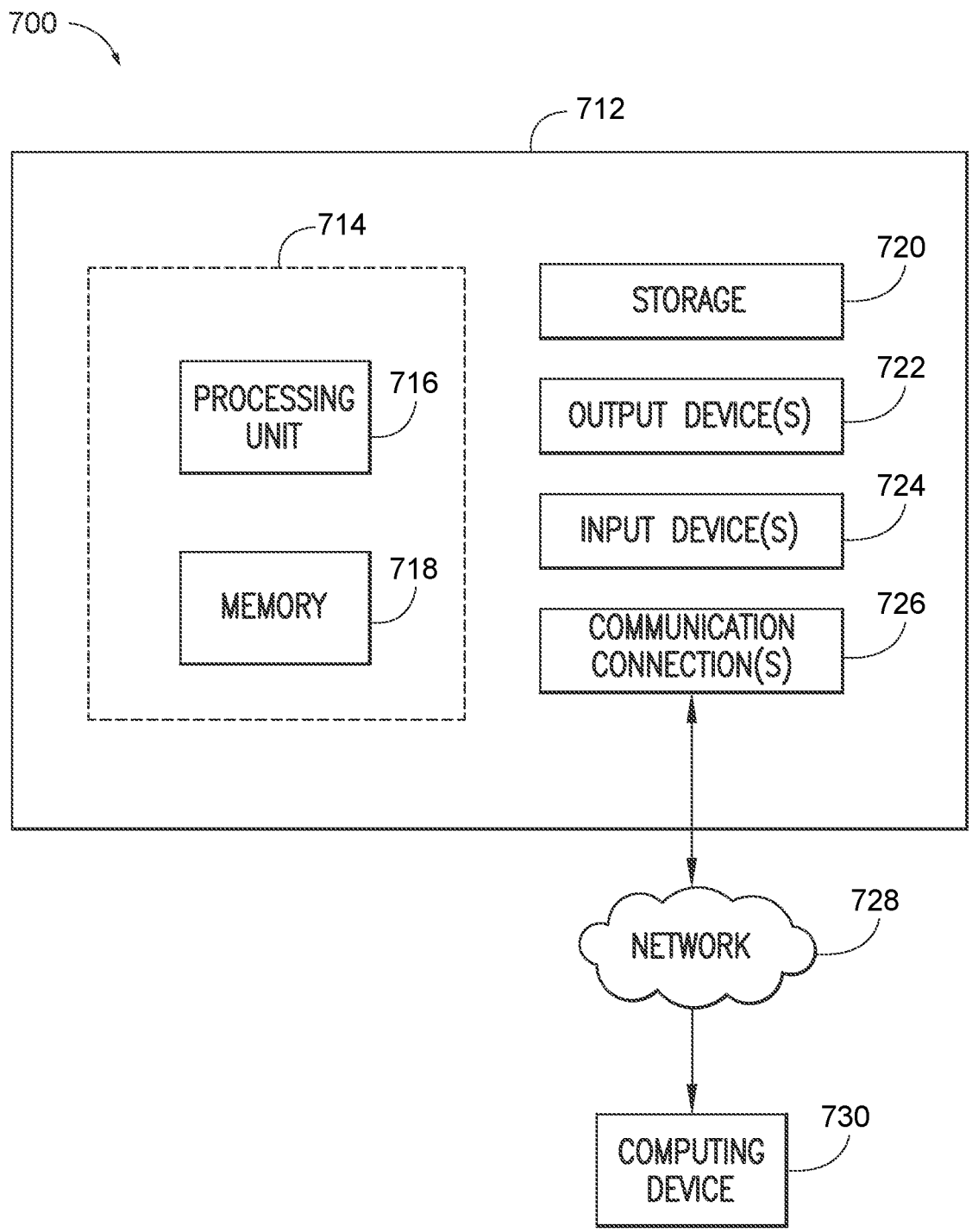
FIG. 7 is an illustration of an example computing environment where one or more of the provisions set forth herein are implemented, according to one aspect.

FIG. 7 and the following discussion provide a description of a suitable computing environment to implement aspects of one or more of the provisions set forth herein. The operating environment of FIG. 7 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 7 illustrates a system 700 including an apparatus 712 configured to implement one aspect provided herein. In one configuration, the apparatus 712 includes at least one processing unit 716 and memory 718. Depending on the exact configuration and type of computing device, memory 718 may be volatile, such as RAM, non-volatile, such as ROM, flash memory, etc., or a combination of the two. This configuration is illustrated in FIG. 7 by dashed line 714.

In other aspects, the apparatus 712 includes additional features or functionality. For example, the apparatus 712 may include additional storage such as removable storage or non-removable storage, including, but not limited to, magnetic storage, optical storage, etc. Such additional storage is illustrated in FIG. 7 by storage 720. In one aspect, computer readable instructions to implement one aspect provided herein are in storage 720. Storage 720 may store other computer readable instructions to implement an operating system, an application program, etc. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the apparatus 712. Any such computer storage media is part of the apparatus 712.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The apparatus 712 includes input device(s) 724 such as keyboard, mouse, pen, voice input device, touch input device, infrared cameras, video input devices, or any other input device. Output device(s) 722 such as one or more displays, speakers, printers, or any other output device may be included with the apparatus 712. Input device(s) 724 and output device(s) 722 may be connected to the apparatus 712 via a wired connection, wireless connection, or any combination thereof. In one aspect, an input device or an output device from another computing device may be used as input device(s) 724 or output device(s) 722 for the apparatus 712. The apparatus 712 may include communication connection(s) 726 to facilitate communications with one or more other devices 730, such as through network 728, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for agent exploration of an environment, the system comprising:
a goal state module, implemented via a processor, configured to calculate a goal state of an agent associated with the environment;
a curiosity module, implemented via a processor, configured to:
determine an uncertainty value for the environment; and
calculate a curiosity reward based on the uncertainty value; and
a planning module, implemented via a processor, configured to update a motion plan based on the goal state and the curiosity reward, wherein the updated motion plan causes the agent to collect a new observation when the curiosity reward outweighs the reward associated with the goal state.

2. The system of claim 1, wherein the uncertainty value is based sensor accuracy of a sensor of the agent.

3. The system of claim 1, wherein the uncertainty value is based on an object in the environment.

4. The system of claim 1, wherein the curiosity reward is a accumulative belief state entropy over a planning horizon, wherein the planning horizon is based on an amount of time from an initial action.

5. The system of claim 1, wherein the agent is a host vehicle, wherein the environment is a roadway, and wherein the goal state is based on a planned maneuver of the host vehicle.

6. The system of claim 5, wherein the uncertainty value for the roadway is based on a proximate vehicle on the roadway.

7. A method for agent exploration of an agent in an environment, the method comprising:
calculating a goal state of a goal of the agent associated with the environment;
determining an uncertainty value for the environment;
calculating a curiosity reward based on the uncertainty value; and
updating a motion plan based on the goal state and the curiosity reward, wherein the updated motion plan causes the agent to collect a new observation when the curiosity reward outweighs the reward associated with the goal state.

8. The method of claim 7, wherein the uncertainty value is based sensor accuracy of a sensor of the agent.

9. The method of claim 7, wherein the uncertainty value is based on an object in the environment.

10. The method of claim 7, wherein the curiosity reward is a accumulative belief state entropy over a planning horizon, wherein the planning horizon is based on an amount of time from an initial action.

11. The method of claim 7, wherein the agent is a host vehicle, wherein the environment is a roadway, and wherein the goal state is based on a planned maneuver of the host vehicle.

12. The method of claim 11, wherein the uncertainty value for the roadway is based on a proximate vehicle on the roadway.

13. A non-transitory computer readable storage medium storing instructions that when executed by a computer having a processor to perform a method for agent exploration of an agent in an environment, the method comprising:
   calculating a goal state of a goal of the agent associated with the environment;
   determining an uncertainty value for the environment;
   calculating a curiosity reward based on the uncertainty value; and
   updating a motion plan based on the goal state and the curiosity reward, wherein the updated motion plan causes the agent to collect a new observation when the curiosity reward outweighs the reward associated with the goal state.

14. The non-transitory computer readable storage medium of claim 13, wherein the uncertainty value is based sensor accuracy of a sensor of the agent.

15. The non-transitory computer readable storage medium of claim 13, wherein the uncertainty value is based on an object in the environment.

16. The non-transitory computer readable storage medium of claim 13, the method wherein the curiosity reward is a accumulative belief state entropy over a planning horizon, wherein the planning horizon is based on an amount of time from an initial action.

17. The non-transitory computer readable storage medium of claim 13, wherein the agent is a host vehicle, wherein the environment is a roadway, wherein the goal state is based on a planned maneuver of the host vehicle, wherein the uncertainty value for the roadway is based on a proximate vehicle on the roadway.

* * * * *